B. J. S. CAHILL.
GEOGRAPHICAL GLOBE.
APPLICATION FILED FEB. 11, 1913.

1,081,207.

Patented Dec. 9, 1913.

WITNESSES

INVENTOR
B. J. S. Cahill
BY Francis M. Wright,
ATTORNEY

COLUMBIA PLANOGRAPH CO., WASHINGTON, D. C.

UNITED STATES PATENT OFFICE.

BERNARD J. S. CAHILL, OF SAN FRANCISCO, CALIFORNIA.

GEOGRAPHICAL GLOBE.

1,081,207.      Specification of Letters Patent.      Patented Dec. 9, 1913.

Application filed February 11, 1913. Serial No. 747,717.

*To all whom it may concern:*

Be it known that I, BERNARD J. S. CAHILL, a subject of the King of Great Britain, residing at San Francisco, in the county of San Francisco and State of California, have invented new and useful Improvements in Geographical Globes, of which the following is a specification.

In my U. S. Letters Patent, dated Feb. 25, 1913 Number 1,054,276, I have disclosed a method of representation of the earth's surface, in which it is supposed to be divided by three great circles at right angles to one another, one of them being the equator, into eight equi-lateral right-angled spherical triangles or lobes, the four upper or northern equi-lateral triangles or lobes being maintained in contiguity along a parallel of north latitude of 41° 48′, 21″, these lobes, which are really, of course, spherical surfaces, being slightly distorted, so that all eight lobes can be shown on a plane land surface. It was explained that by this method of projection, the distortion of the surface of the earth was much less than by any prior form of projection of said spherical surface on to a plane surface.

I have devised a simple and inexpensive device, by which the projection onto a plane surface of the spherical surface of the earth may be made very clear and be quickly apprehended.

Figure 1:
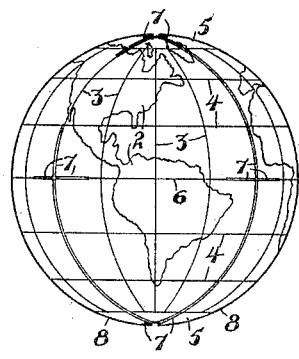
Figure 3:
Figure 2:
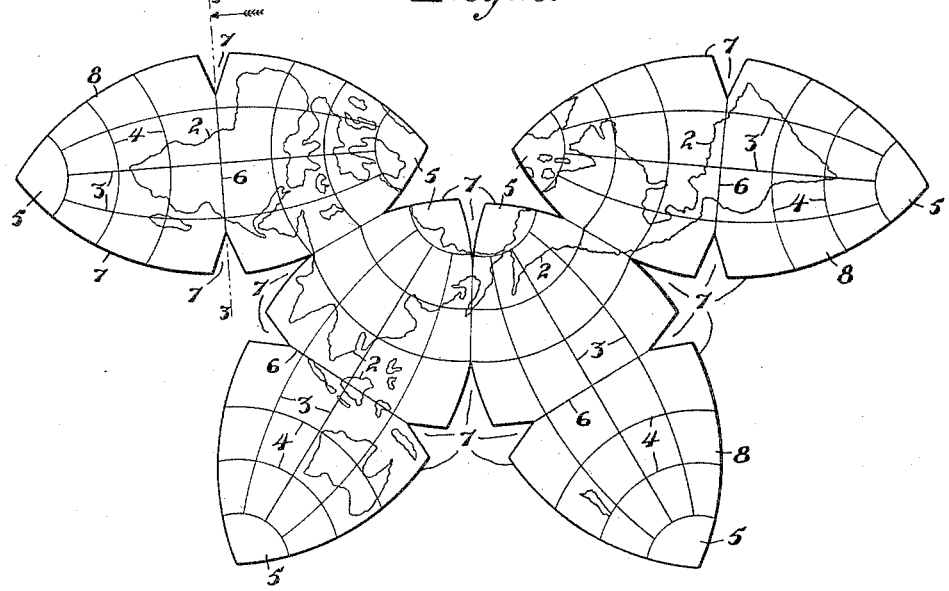

In the accompanying drawing, Figure 1 is a side view of my device; Fig. 2 is a similar view of the same extended; Fig. 3 is a section on the line 3—3 of Fig. 2.

My improved device consists of a hollow ball 1 of soft rubber, on which is delineated a representation 2 of the earth's land surface, and of a sufficient number of the meridians 3 of longitude and parallels 4 of latitude. At the two poles 5, and at four equi-distant points on the equator 6, incisions 7 are made through the rubber of said ball, each extending in two directions at right angles, through an arc of 22½° there being at the poles and at the equator north and south incisions on the same meridians, and there being also at the equator east and west incisions. If it be desired to show the relation between the land portions more particularly around the north pole, I then extend the incisions at the southern side of the equator, and connect them with the incisions of the south pole, so that the southern lobes 8 thus formed are not directly connected with one another. I have in the drawing illustrated the incisions as so formed. If it is desired to show the relation of the land portion of the earth's surface more particularly around the south pole, then, on the contrary, I should extend the northern incisions to connect with one another. The incision along one meridian, however, I extend from pole to pole, so that all the spherical surfaces of the rubber lobes can be extended closely adjacent to a plane surface, as illustrated in Fig. 2. This meridian of complete severance I prefer to make that of 22½° west longitude, as said meridian passes through practically no land surface.

The ball is made of rubber sufficiently thick that when released from pressure holding it extended it immediately reassumes the spherical form. In this form, it gives a very good general representation of the form of the earth's surface, while, when extended, it very closely resembles the map above referred to and can be used as many times as desired to explain instantaneously said system of projection by which the map is obtained.

It will be understood that the word "rubber" is herein intended to include any yielding material of extreme resiliency.

I claim:—

A soft rubber hollow ball having thereon a representation of the earth's surface, severed along a line extending meridionally from pole to pole, and having other meridional incisions extending from the poles and spaced a right angle, those of one pole extending therefrom each way more than a quadrant, and those of the other pole extending therefrom each way less than half a quadrant, said ball being formed with incisions less than half a quadrant extending along the equator each way from the first-named incisions, said rubber being sufficiently thick to cause the ball to re-assume a spherical form from an extended form when permitted.

In testimony whereof I have hereunto set my hand in the presence of two subscribing witnesses.

BERNARD J. S. CAHILL.

Witnesses:
FRANCIS M. WRIGHT,
D. B. RICHARDS.

Copies of this patent may be obtained for five cents each, by addressing the "Commissioner of Patents, Washington, D. C."